(12) United States Patent
Minamitani

(10) Patent No.: US 9,925,740 B2
(45) Date of Patent: Mar. 27, 2018

(54) METHOD OF MANUFACTURING LAMINATED ARMORING MATERIAL

(71) Applicant: Showa Denko Packaging Co., Ltd., Isehara-shi, Kanagawa (JP)

(72) Inventor: Koji Minamitani, Minato-ku (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 391 days.

(21) Appl. No.: 14/679,176

(22) Filed: Apr. 6, 2015

(65) Prior Publication Data

US 2015/0283790 A1    Oct. 8, 2015

(30) Foreign Application Priority Data

Apr. 7, 2014   (JP) ................. 2014-078786

(51) Int. Cl.
     *B29C 65/54*          (2006.01)
     *B32B 7/14*           (2006.01)
     (Continued)

(52) U.S. Cl.
CPC ................ *B32B 7/14* (2013.01); *B32B 7/045* (2013.01); *B32B 15/08* (2013.01); *B32B 27/32* (2013.01); *B32B 27/34* (2013.01); *B32B 27/36* (2013.01); *B32B 27/40* (2013.01); *B32B 37/0053* (2013.01); *B32B 37/0076* (2013.01); *B32B 37/02* (2013.01); *B32B 37/1292* (2013.01); *B32B 38/10* (2013.01); *B32B 2250/03* (2013.01); *B32B 2255/06* (2013.01); *B32B 2255/26* (2013.01); *B32B 2307/306* (2013.01);

(Continued)

(58) Field of Classification Search
USPC ....... 156/247, 250, 257, 267, 268, 291, 701, 156/717
See application file for complete search history.

(56) References Cited

U.S. PATENT DOCUMENTS

| | | | | |
|---|---|---|---|---|
| 4,156,054 A | * | 5/1979 | Gurewitsch | ............. B29C 65/00 428/583 |
| 5,098,751 A | * | 3/1992 | Tamura | ................... B32B 15/08 229/125.35 |

(Continued)

FOREIGN PATENT DOCUMENTS

| | | |
|---|---|---|
| JP | 2000-177030 A | 6/2000 |
| JP | 2010-092703 A | 4/2010 |
| WO | 2009/090930 A1 | 7/2009 |

*Primary Examiner* — Sing P Chan
(74) *Attorney, Agent, or Firm* — Keating and Bennett, LLP

(57) ABSTRACT

In laminating resin layers on both surfaces of a metal foil layer by adhering a heat-resistant resin layer to a first surface of the metal foil layer and adhering a heat-sealable resin layer to a second surface thereof, as an adhering method, by employing an adhesive agent unapplied portion forming and adhering process in which the resin layer and the metal foil layer are adhered together by applying an adhesive agent to a region of a joining face of both the layers excluding a part of the region so that an adhesive agent unapplied section is formed, a laminated body having the adhesive agent unapplied section is manufactured. A resin layer removal process for removing a resin layer corresponding to the adhesive agent unapplied section of the laminated body to expose the metal foil layer is performed.

9 Claims, 4 Drawing Sheets

(51) Int. Cl.
  *B32B 37/12* (2006.01)
  *B32B 37/30* (2006.01)
  *B32B 38/10* (2006.01)
  *B32B 43/00* (2006.01)
  *B32B 7/04* (2006.01)
  *B32B 37/00* (2006.01)
  *B32B 37/02* (2006.01)
  *B32B 15/08* (2006.01)
  *B32B 27/32* (2006.01)
  *B32B 27/34* (2006.01)
  *B32B 27/36* (2006.01)
  *B32B 27/40* (2006.01)

(52) U.S. Cl.
  CPC ... *B32B 2307/31* (2013.01); *B32B 2310/0843* (2013.01); *B32B 2311/12* (2013.01); *B32B 2311/16* (2013.01); *B32B 2311/22* (2013.01); *B32B 2311/24* (2013.01); *B32B 2323/04* (2013.01); *B32B 2323/10* (2013.01); *B32B 2367/00* (2013.01); *B32B 2377/00* (2013.01); *B32B 2571/02* (2013.01); *Y10T 156/1082* (2015.01); *Y10T 428/24851* (2015.01)

(56) References Cited

U.S. PATENT DOCUMENTS

| | | | | |
|---|---|---|---|---|
| 5,639,523 | A * | 6/1997 | Ellis | B65D 5/4216 206/484 |
| 5,856,068 | A * | 1/1999 | Magera | H05K 3/184 430/312 |
| 6,085,627 | A * | 7/2000 | Denney | B26D 3/281 264/163 |
| 6,286,207 | B1 * | 9/2001 | Oura | C23C 18/1608 205/126 |
| 6,548,128 | B2 * | 4/2003 | Auld | B44C 3/02 428/13 |
| 6,596,644 | B1 * | 7/2003 | Andrews | B29C 59/16 347/65 |
| 6,632,538 | B1 * | 10/2003 | Yamazaki | H01M 2/021 428/213 |
| 6,808,773 | B2 * | 10/2004 | Shimamura | H01J 5/08 313/112 |
| 6,855,625 | B2 * | 2/2005 | Kondo | H05K 3/4617 156/150 |
| 7,001,659 | B2 * | 2/2006 | Iriyama | B29C 45/14811 428/195.1 |
| 7,086,146 | B2 * | 8/2006 | Shimamura | H01J 5/08 156/272.8 |
| 7,178,233 | B2 * | 2/2007 | Nakamura | H01L 21/4857 257/E23.062 |
| 7,191,517 | B2 * | 3/2007 | Shimamura | H01J 5/08 174/350 |
| 7,326,492 | B2 * | 2/2008 | Abe | H01M 2/0212 29/623.4 |
| 7,624,762 | B2 * | 12/2009 | Cohen | B32B 15/08 138/149 |
| 7,846,580 | B2 * | 12/2010 | Oh | H01M 2/021 29/623.2 |
| 8,043,743 | B2 * | 10/2011 | Park | H01M 2/0212 429/162 |
| 8,211,568 | B2 * | 7/2012 | Yamashita | H01M 2/021 429/122 |
| 8,323,828 | B2 * | 12/2012 | Yamazaki | H01M 2/021 429/141 |
| 8,455,135 | B2 * | 6/2013 | Yamazaki | H01M 2/021 429/144 |
| 8,536,460 | B2 * | 9/2013 | Lin | B32B 7/12 174/255 |
| 8,673,771 | B2 * | 3/2014 | Kawamura | H01L 21/0272 438/637 |
| 8,728,577 | B2 * | 5/2014 | Goto | B29C 45/1418 156/242 |
| 8,785,030 | B2 * | 7/2014 | Ueda | H01M 10/052 429/127 |
| 9,362,535 | B2 * | 6/2016 | Utley | H01M 2/024 |
| 9,389,511 | B2 * | 7/2016 | Schwartz | G03F 7/16 |
| 9,466,841 | B2 * | 10/2016 | Yoshida | H01M 2/029 |
| 9,718,997 | B2 * | 8/2017 | Cyman, Jr. | C09J 133/14 |
| 9,806,303 | B2 * | 10/2017 | Akita | H01M 2/0287 |
| 2002/0083586 | A1 * | 7/2002 | Iijima | H05K 3/0035 29/847 |
| 2002/0142111 | A1 * | 10/2002 | Auld | B44C 3/02 428/13 |
| 2003/0007341 | A1 * | 1/2003 | Shimamura | H01J 5/08 361/816 |
| 2003/0134444 | A1 * | 7/2003 | Andrews | B29C 59/16 438/21 |
| 2003/0148044 | A1 * | 8/2003 | Auld | B44C 3/02 428/13 |
| 2004/0029001 | A1 * | 2/2004 | Yamazaki | H01M 2/021 429/176 |
| 2004/0111882 | A1 * | 6/2004 | Nakamura | H01L 21/4857 29/846 |
| 2004/0151922 | A1 * | 8/2004 | Cohen | B32B 5/02 428/458 |
| 2004/0161615 | A1 * | 8/2004 | Cohen | B32B 15/08 428/432 |
| 2004/0231873 | A1 * | 11/2004 | Shimamura | H01J 5/08 174/394 |
| 2005/0008828 | A1 * | 1/2005 | Libera | B82Y 30/00 428/195.1 |
| 2005/0266217 | A1 * | 12/2005 | Cohen | B32B 5/02 428/215 |
| 2006/0054235 | A1 * | 3/2006 | Cohen | B32B 15/08 138/149 |
| 2006/0200983 | A1 * | 9/2006 | Shimamura | H01J 5/08 29/847 |
| 2006/0262157 | A1 * | 11/2006 | Park | B41J 2/1603 347/20 |
| 2006/0275692 | A1 * | 12/2006 | Okawa | G11B 5/855 430/269 |
| 2008/0241360 | A1 * | 10/2008 | Yoshida | H05K 3/0079 427/98.4 |
| 2009/0035654 | A1 * | 2/2009 | Kodama | H01M 2/0207 429/179 |
| 2009/0117454 | A1 * | 5/2009 | Takita | B01D 69/02 429/145 |
| 2009/0212008 | A1 * | 8/2009 | Uyama | B41J 2/14145 216/27 |
| 2010/0044081 | A1 * | 2/2010 | Morimoto | H01L 21/4857 174/251 |
| 2010/0080893 | A1 * | 4/2010 | Inoue | C23C 18/14 427/123 |
| 2010/0086760 | A1 * | 4/2010 | Zhu | B82Y 30/00 428/220 |
| 2011/0114371 | A1 * | 5/2011 | Lin | B32B 7/12 174/254 |
| 2011/0146064 | A1 * | 6/2011 | Feaver | H01M 2/1673 29/623.2 |
| 2011/0318545 | A1 * | 12/2011 | Goto | B29C 45/1418 428/195.1 |
| 2012/0244421 | A1 * | 9/2012 | Yamazaki | H01M 2/021 429/176 |
| 2013/0230981 | A1 * | 9/2013 | Kawamura | H01L 21/0272 438/637 |
| 2014/0205818 | A1 * | 7/2014 | Schwartz | G03F 7/16 428/201 |
| 2015/0283790 | A1 * | 10/2015 | Minamitani | B32B 15/08 428/201 |
| 2015/0323292 | A1 * | 11/2015 | Strauss | F41H 5/0485 89/36.02 |
| 2015/0343738 | A1 * | 12/2015 | Strauss | B30B 5/02 428/69 |
| 2016/0155743 | A1 * | 6/2016 | Kim | H01L 21/76816 438/702 |
| 2016/0347023 | A1 * | 12/2016 | Dodds | B32B 27/08 |

(56) References Cited

U.S. PATENT DOCUMENTS

2017/0077487 A1\* 3/2017 Coakley .............. H01M 2/202
2017/0080603 A1\* 3/2017 Lovis .................. B29L 317/02
2017/0115778 A1\* 4/2017 Kanna ................... G06F 3/044

\* cited by examiner

METHOD OF MANUFACTURING LAMINATED ARMORING MATERIAL

BACKGROUND OF THE INVENTION

Field of the Invention

The present disclosure relates to a method of manufacturing a laminated armoring material used as, e.g., a case for batteries, capacitors or the like, or a packaging material for food products, pharmaceutical products or the like, and also relates to its related technologies.

Description of the Related Art

The following description of related art sets forth the inventors' knowledge of related art and certain problems therein and should not be construed as an admission of knowledge in the prior art.

In recent years, as mobile devices such as smartphones, tablet terminals, etc., are made thinner and lighter, as an armoring material for lithium ion secondary batteries or lithium polymer secondary batteries to be loaded in such mobile devices, in place of conventional metallic cans, a laminated material in which resin films are adhered on both surfaces of a metal foil is used. Further, as an armoring material, also in large batteries or capacitors for a power storage or a power source for electric vehicles, the use of a laminated material is being considered.

In general, although a laminated armoring material is thinner, lighter, and easier in forming and sealing, and therefore easier in handling in comparison to a metallic can, in a case of being used as a battery case, the metal face is never exposed outside. Therefore, the armoring material itself cannot be used as a conductor like in a dry battery. As a result, in many cases, insulated positive and negative electrode terminals are pulled out from the case for wire connection by soldering, etc., and the battery itself is fixed to a substrate or a housing with an adhesive tape, etc. Further, also for applications other than a battery case, an exposure of a metal face of a container package capable of efficient heating jam or prepared food products by contacting to a heating element or sterilizing by joule heating is desired.

In a laminated armoring material, since a metal foil is employed in the center of the layer, if the metal foil can be exposed by removing the outside resin layer, there is a possibility that it can be used as a conductor or a soldering section, etc.

As a technology for cutting only a resin layer without cutting a metal foil of a laminated armoring material, in a packaging bag for packaging food products or pharmaceutical tools in a sealed state, there is an easy-to-open packaging bag capable of being opened with one hand by forming a slit in the resin layer by laser processing or mechanical processing using a metal blade (see Patent Document 1: International Publication No. WO2009/090930).

The Patent Document 1 is directed to a technology for cutting a laminated armoring material in the cross-sectional direction to open a packaging bag, which cannot be employed for exposing a metal foil by removing a resin layer. Even if a laser is irradiated on a resin layer, a linear slit may be merely formed and the resin layer will not be removed in a plane shape, which does not cause an exposure of the metal foil having an area capable of being used for soldering. Further, it is very troublesome to reciprocate a laser to burn out the surface of a resin layer so that no resin remains.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The embodiments of the present invention have been made in view of the aforementioned technical background, and aim to provide a method of easily manufacturing a laminated armoring material in which resin layers are adhered on both surfaces of a metal foil layer and the metal foil layer is partially exposed, and also aim to provide its related technologies.

(1) According to a first aspect of the present invention, in some embodiments of the present disclosure, a method of manufacturing a laminated armoring material, includes: adhering a first resin layer to a first surface of a metal foil layer via a first adhesive agent layer; adhering a second resin layer to a second surface of the metal foil layer via a second adhesive agent layer; and removing a part of at least one of the first resin layer and the second resin layer. The at least one of the first resin layer and the second resin layer is adhered to the metal foil layer via one of the first adhesive agent layer and the second adhesive agent layer formed by applying an adhesive agent to a joining region of the metal foil layer and the at least one of the first resin layer and the second resin layer excluding a part of the joining region so that an adhesive agent unapplied section in which the adhesive agent is not applied is formed. The part of at least one of the first resin layer and the second resin layer corresponds to the adhesive agent unapplied section, and is removed to expose the metal foil layer.

(2) In some embodiments of the present disclosure, in the method of manufacturing the laminated armoring material as recited in the aforementioned Item 1, the adhesive agent is applied using a roll having concave and convex portions on a peripheral surface to form the adhesive agent unapplied section corresponding to a shape of the convex portion.

(3) In some embodiments of the present disclosure, in the method of manufacturing the laminated armoring material as recited in the aforementioned Item 1 or 2, removing the part of at least one of the first resin layer and the second resin layer is executed to a flat-sheet like laminated body for an armoring material before being processed into a case.

(4) In some embodiments of the present disclosure, in the method of manufacturing the laminated armoring material as recited in the aforementioned Item 1 or 2, removing the part of at least one of the first resin layer and the second resin layer is executed after a flat-sheet like laminated body for a laminated armoring material is processed into a case.

(5) In some embodiments of the present disclosure, in the method of manufacturing the laminated armoring material as recited in the aforementioned Items 3 or 4, the process into the case is a plastic deformation process for forming a concave portion from a flat sheet.

(6) In some embodiments of the present disclosure, in the method of manufacturing the laminated armoring material as recited in the aforementioned Items 3 or 4, the process into the case is a bag-making process for forming a flat sheet into a bag shape.

(7) In some embodiments of the present disclosure, in the method of manufacturing the laminated armoring material as recited in any one of the aforementioned Items 1 to 6, the part of at least one of the first resin layer and the second resin layer is cut by irradiating a laser.

(8) In some embodiments of the present disclosure, in the method of manufacturing the laminated armoring material as recited in any one of the aforementioned Items 1 to 7, a conductive plating film is formed at least on a metal exposed section of the metal foil layer.

(9) In some embodiments of the present disclosure, in the method of manufacturing the laminated armoring material as recited in any one of the aforementioned Items 1 to 8, the first resin layer is a heat-resistant layer and the second resin layer is a heat-sealable layer.

(10) According to a second aspect of the present invention, in some embodiments of the present disclosure, a laminated sheet armoring material is manufactured by the method as recited in any one of the aforementioned Items 1 to 9.

(11) According to a third aspect of the present invention, in some embodiments of the present disclosure, in a laminated body for a laminated armoring material, at least one of a heat-resistant resin layer adhered to a first surface of a metal foil layer and a heat-sealable resin layer adhered to a second surface of the metal foil layer is adhered by an adhesive agent layer including an adhesive agent unapplied section.

According to some embodiment of the invention as recited in Item (1), since an adhesive agent unapplied section forming and adhering process is employed for at least one of the adhering of the first surface of the metal foil layer and the heat-resistance resin layer and the adhering of the second surface of the metal foil layer and the heat-sealable resin layer, a laminated body for a laminated armoring material in which the metal foil layer and the resin layer are adhered together by the adhesive agent layer including the adhesive agent unapplied section on a surface to which this process is applied, can be obtained.

Also, in the resin layer removal process, when a resin layer corresponding to the adhesive layer unapplied section is removed from the laminated body for a laminated armoring material, a laminated armoring material having a metal exposed section in which the metal foil layer is exposed can be obtained. At the adhesive agent unapplied section, since the resin layer is not joined to the metal foil layer and the adhesive agent is not interposed therebetween, by removing the resin layer, the metal foil layer can be assuredly exposed without causing a remained adhesive agent.

According to some embodiments of the invention as recited in the aforementioned Item (2), in the adhesive agent unapplied section forming and adhering process, an adhesive agent unapplied section having a shape corresponding to a shape of the convex portion can be formed.

According to some embodiments of the invention as recited in the aforementioned Item (3), a metal exposed section can be formed on a flat-sheet like laminated body for a laminated armoring material before being processed into a case.

According to some embodiments of the invention as recited in the aforementioned Item (4), a metal exposed section can be formed on a flat-sheet like laminated body for a laminated armoring material processed into a case.

According to some embodiments of the invention as recited in the aforementioned Item (5), a laminated armoring material having a metal exposed section formed into a three dimensional case having concave portions by a plastic deformation process can be obtained.

According to some embodiments of the invention as recited in the aforementioned Item (6), a laminated armoring material having a metal exposed section formed into a bag shaped case by a bag-making process can be obtained.

According to some embodiments of the invention as recited in the aforementioned Item (7), since the resin layer is cut off by laser irradiation, it is possible to cut only a film without causing burrs with a predetermined irradiation output.

According to some embodiments of the invention as recited in the aforementioned Item (8), a laminated armoring material in which the metal exposed section can be used as a conductor can be obtained.

According to some embodiments of the invention as recited in the aforementioned Item (9), a laminated body for a laminated armoring material can be manufactured.

According to some embodiments of the invention of the aforementioned Item (10), since a metal exposed section in which the metal foil layer is exposed is formed on the surface, the metal exposed section can be joined to an object by soldering, ultrasonic waves, high frequency waves, etc., or can be used to heat contents or flow electricity.

According to some embodiments of the invention as recited in the aforementioned Item (11), since the metal foil layer and at least one of the heat-resistant resin layer and the heat-sealable resin layer are adhered together by an adhesive agent layer including an adhesive agent unapplied section, by removing a resin layer corresponding to the adhesive agent unapplied section, a laminated armoring material in which the metal foil layer is exposed can be obtained.

BRIEF DESCRIPTION OF THE DRAWINGS

The disclosed embodiments of the present invention are shown by way of example, and not limitation, in the accompanying figures.

EMBODIMENTS FOR CARRYING OUT THE INVENTION

In the following paragraphs, some embodiments of the invention will be described by way of example and not limitation. It should be understood based on this disclosure that various other modifications can be made by those in the art based on these illustrated embodiments.

[Laminated Armoring Material]

Figure 1A:
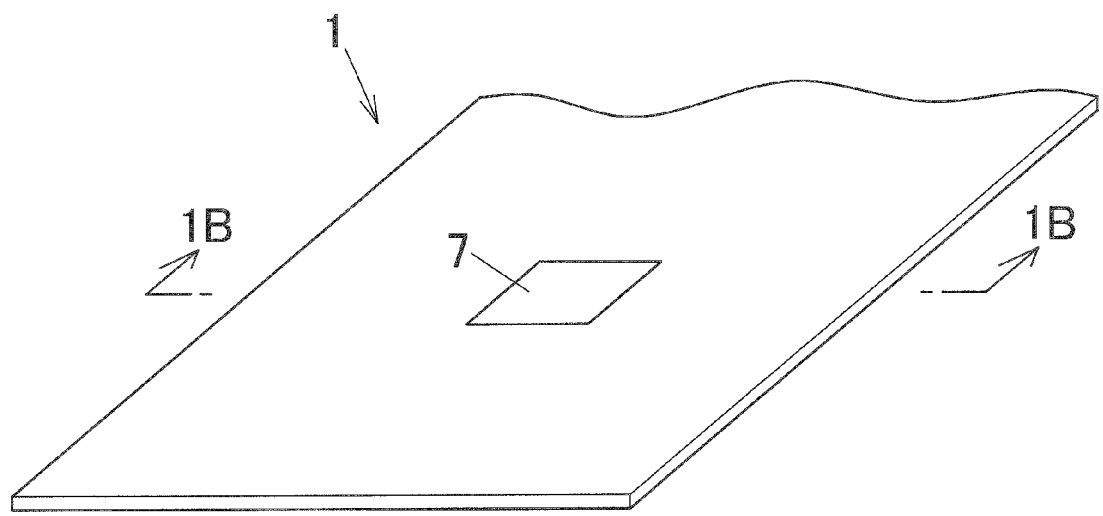
FIG. 1A is a perspective view of a laminated armoring material manufactured by a method of the present invention.
Figure 1B:
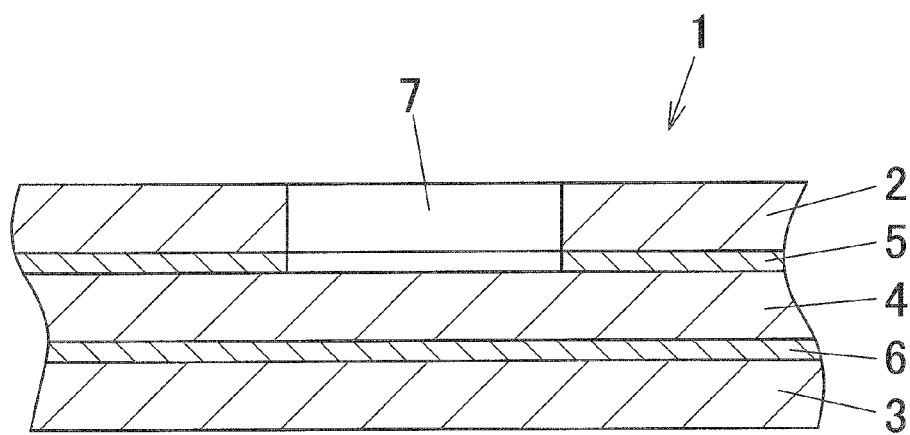
FIG. 1B is a cross-sectional view taken along the line 1B-1B in FIG. 1A.

FIGS. 1A and 1B show a laminated armoring material 1 according to an embodiment of the present invention. The laminated armoring material 1 is used as a battery case for lithium ion secondary batteries, etc., or a packaging material for food products or pharmaceutical products.

In the laminated armoring material 1, a heat-resistant resin layer 2 as an outer layer is laminated on a first surface of a metal foil layer 4 via a first adhesive agent layer 5, a heat-sealable resin layer 3 as an inner layer is laminated on a second surface of the metal foil layer 4 via a second adhesive agent layer 6, and the resin layers 2 and 3 are laminated on both surfaces of the metal foil layer 4. Further, on the heat-resistant resin layer 2 side, a metal exposed section 7 in which the metal foil layer 4 is exposed in a plane shape is formed. At the metal exposed section 7, the first adhesive agent layer 5 and the heat-resistant resin layer 2 do not exist.

[Method of Manufacturing Laminated Armoring Material]

Figure 2:
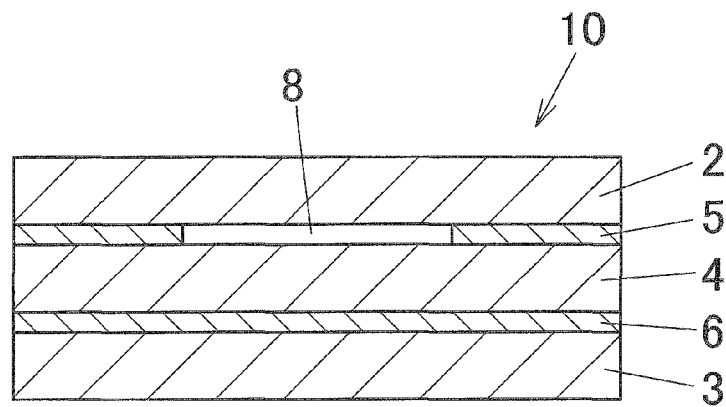
FIG. 2 is a cross-sectional view of a laminated body of the laminated armoring material.

The laminated armoring material 1 is manufactured by pasting or adhering (hereinafter referred to as "adhering") the heat-resistant resin layer 2 and the heat-sealable resin layer 3 on the surfaces of the metal foil layer 4, then removing a portion of the heat-resistant resin layer 2 to expose the metal foil layer 4. In these processes, as a method of adhering the heat-resistant resin layer 2 on the first surface side of the metal foil layer 4, an adhesive agent unapplied section forming and adhering process prescribed by the present invention is employed, and as a method of adhering the heat-sealable resin layer 3 on the second surface side of the metal foil layer 4, a known adhering process is employed to manufacture a laminated body 10 of a laminated armoring material as shown in FIG. 2, and a resin layer removal process is executed to the laminated body 10 for a laminated armoring material. Hereinafter, each process will be detailed.

[Adhering Metal Foil Layer and Heat-Resistant Resin Layer (Adhesive Agent Unapplied Section Forming and Adhering Process)]

The heat-resistant resin layer 2 is adhered to a first surface of the metal foil layer 4. At this time, an adhesive agent constituting a first adhesive agent layer 5 is applied to a region excluding a portion corresponding to the metal exposed section 7, and the adhesive agent is not applied to a region corresponding to the metal exposed section 7. That is, in a state in which an adhesive agent unapplied section 8 in which an adhesive agent is not applied is formed, the metal foil layer 4 and the heat-resistant resin layer 2 are adhered together. The adhesive agent 5 can be applied to either the joining surface of the metal foil layer 4 or the heat-resistant resin layer 2.

Figure 3:
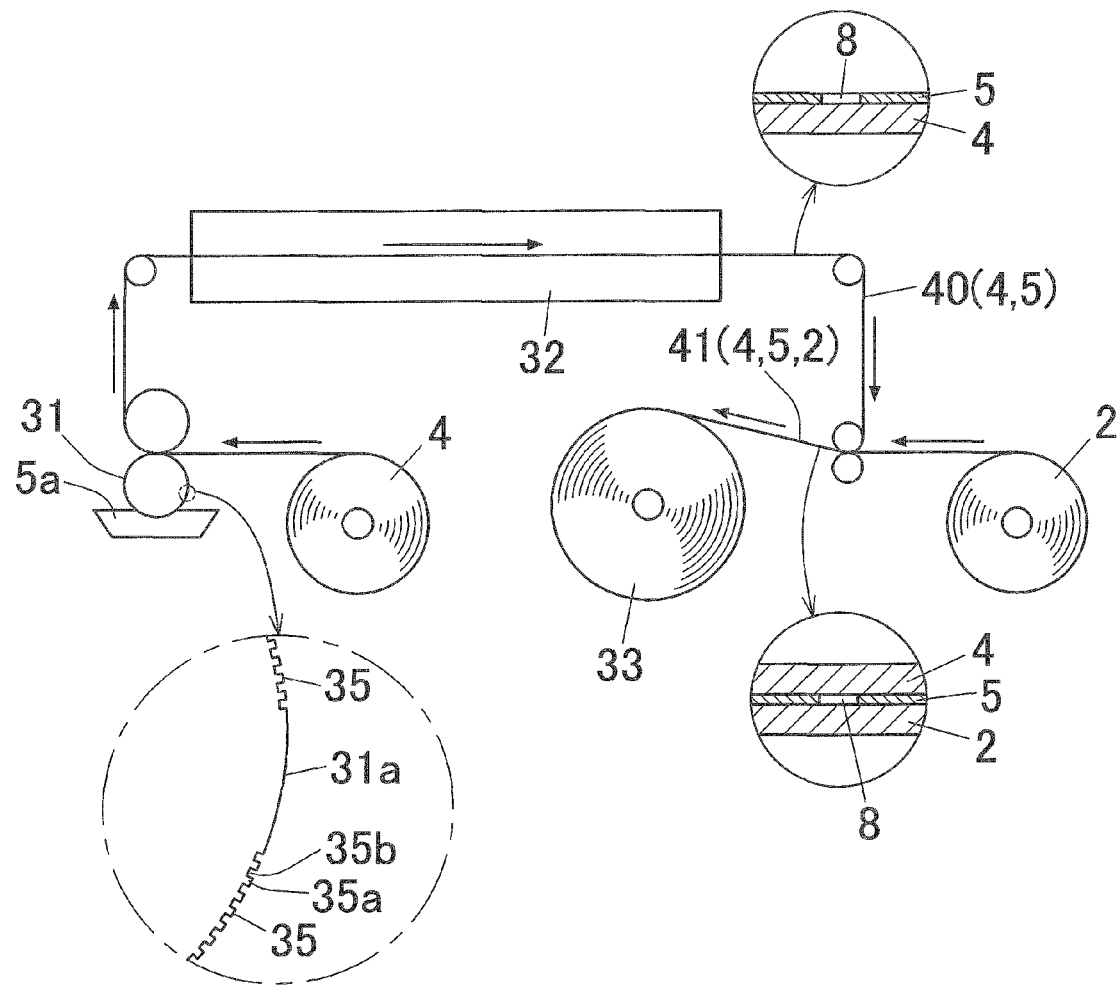
FIG. 3 is a schematic diagram showing an adhesive agent unapplied section forming and adhering process.

As a method of forming the adhesive agent unapplied section 8 on a portion of the joining surface, in a roll application as shown in FIG. 3, a method of using a roll 31 having concave and convex portions on a peripheral surface can be recommended. The entire outer peripheral surface of the roll 31 is a latticed minute concave and convex region 35 in which minute convex portions 35a and minute concave portions 35b are alternately repeated, and metal exposed section forming convex portions 31a corresponding to a shape of the metal exposed section 7 are formed in the minute concave and convex region 35. The minute convex portion 35a and the metal exposed section forming convex portion 31a are the same in height and when their top surfaces are considered as a base surface of the roll 31, the minute concave portions 35b are retracted from the base surface. An adhesive agent is applied to the entire outer peripheral surface of the roll 31, and the adhesive agent is scraped off from the top surface of the metal exposed section forming convex portions 31a and the top surfaces of the minute convex portions 35a of the minute concave and convex regions 35 using a doctor blade to remain the adhesive agent only in the minute concave portions 35b. By applying the adhesive agent on the application surface of the metal foil layer 4 or the heat-resistant resin layer 2 using the roll 31 to which the adhesive agent is adhered in the aforementioned manner, the adhesive agent adheres to the corresponding portions of the minute concave and convex region 35 in a dot shape or a lattice shape corresponding to the shapes of the minute concave portions 35b. Thus, adhesive agent unapplied sections 8 in which no adhesive agent is applied are formed at the portions corresponding to the metal exposed section forming convex portions 31a. At the corresponding portions of the minute concave and convex regions 35, although the adhesive agent is not adhered to the corresponding portions of the minute convex portions 35a, the adhesive agent adhered to the corresponding portions of the minute concave portions 35b wetly spreads to the corresponding portions of the minute convex portions 35a. Then, when pressure-joining the metal foil layer 4 and the heat-resistant resin layer 2, the adhesive agent spreads further, resulting in a state in which the adhesive agent is evenly applied to the corresponding sections of the minute concave and convex regions 35. In the aforementioned manner, at the joining surface of the metal foil layer 4 and the heat-resistant resin layer 2, the adhesive agent unapplied sections 8 are formed on the corresponding positions of the convex portions 31a of the roll 31 and the first adhesive agent layer 5 is formed on a region excluding the adhesive agent unapplied section 8.

Further, a case in which the adhesive agent is applied to both the metal foil layer 4 and the heat-resistant resin layer 2 is included in the technical scope of the present invention. In the case of applying the adhesive agent to both layers 4 and 2, it is required that the positions of the adhesive agent unapplied sections match after adhering both the layers.

The adhering conditions after applying the adhesive agent are arbitrarily set according to the characteristics of the adhesive agent to be used. As shown in FIG. 3, when employing a dry laminating method, after applying an adhesive agent composition 5a whose density is adjusted by a solvent to one layer 4, the solvent is evaporated and dried with a drying machine 32 to form a first adhesive agent layer 5 to thereby obtain a two-layer body 40. Afterward, the other layer 2 is stacked, pressure-joined, and adhered on the surface of the first adhesive agent layer 5 of the two-layered body 40 to obtain an intermediate laminated body 41. The intermediate laminated body 41 is hardened under the conditions according to the adhesive agent.

Further, although FIG. 3 exemplifies a process in which an adhesive agent composition 5a is applied to the metal foil layer 4 and the heat-resistant resin layer 2 is adhered after drying, a similar operation is performed in a case of applying the adhesive agent composition 5a to the heat-resistant resin layer 2.

The application of the adhesive agent composition 5a is performed using the roll 31 having convex portions 31a to form the adhesive agent unapplied sections 8 at positions corresponding to the convex portions 31a of the two-layered body 40. Further, in the intermediate laminated body 41, since there exist adhesive agent unapplied sections 8 in the joining interface of the metal foil layer 4 and the heat-resistant resin layer 2, the metal foil layer 4 and the heat-resistant resin layer 2 will not be joined even when they come in contact with each other by pressure-joining.

In the aforementioned process, the metal foil layer 4 and the heat-resistant resin layer 2 are adhered together while forming un-adhered sections (adhesive agent unapplied sections).

Further, the method of applying the adhesive agent in the adhesive agent unapplied section forming and adhering process is not limited, and a gravure roll coating method, a reverse roll coating method, a lip roll coating method, etc., can be exemplified. Since adhesive agent unapplied sections 8 are formed in the adhesive agent unapplied section forming and adhering process, a gravure roll coating method which is advantageous for forming convex portions on a roll can be recommended.

Further, the application of an adhesive agent in the present invention refers to the act of thinly adhering an adhesive agent, and as an application method other than the aforementioned roll coating methods, spreading by a spray or a doctor blade can be exemplified.

<Adhering Metal Foil Layer and Heat-Sealable Resin Layer>

A heat-sealable resin layer 3 is adhered to a second surface of the metal foil layer 4. Since a metal exposed section 7 is not formed on the heat-sealable resin layer 3 side, an adhesive agent is applied to the entire area of the joining surface of at least one of the metal foil layer 4 and the heat-sealable resin layer 3 for adhering together. The adhering method is not limited, and so a known method such as a dry laminating method, etc., for adhering after applying and drying an adhesive agent composition constituting a second adhesive agent layer 6 can be arbitrarily employed.

The order of adhering the heat-resistant resin layer 2 and the heat-sealable resin layer 3 to the metal foil layer 4 is not limited. For example, by simultaneously executing the adhesive agent application to the heat-resistant resin layer 2 and the adhesive agent application to the heat-sealable resin layer 3 and successively adhering them to the metal foil layer 4, a laminated body 10 for a laminated armoring material having the structure as shown in FIG. 2 can be manufactured. Further, as shown in FIG. 3, by winding up the intermediate laminated body 41 in which the metal foil layer 4 and the heat-resistant resin layer 2 are adhered on a wind-up roll 33 and then adhering a heat-sealable resin layer 3 to the intermediate laminated body 41 by a different line, the laminated body 10 for a laminated armoring material having the layer structure as shown in FIG. 2 can be manufactured.

Further, the method of applying the adhesive agent in the heat-resistant resin layer adhering process and the heat-sealable resin layer adhering process is not limited, and a gravure roll coating method, a reverse roll coating method, a lip roll coating method, etc., can be exemplified.

(Resin Layer Removal Process)

Figure 4:
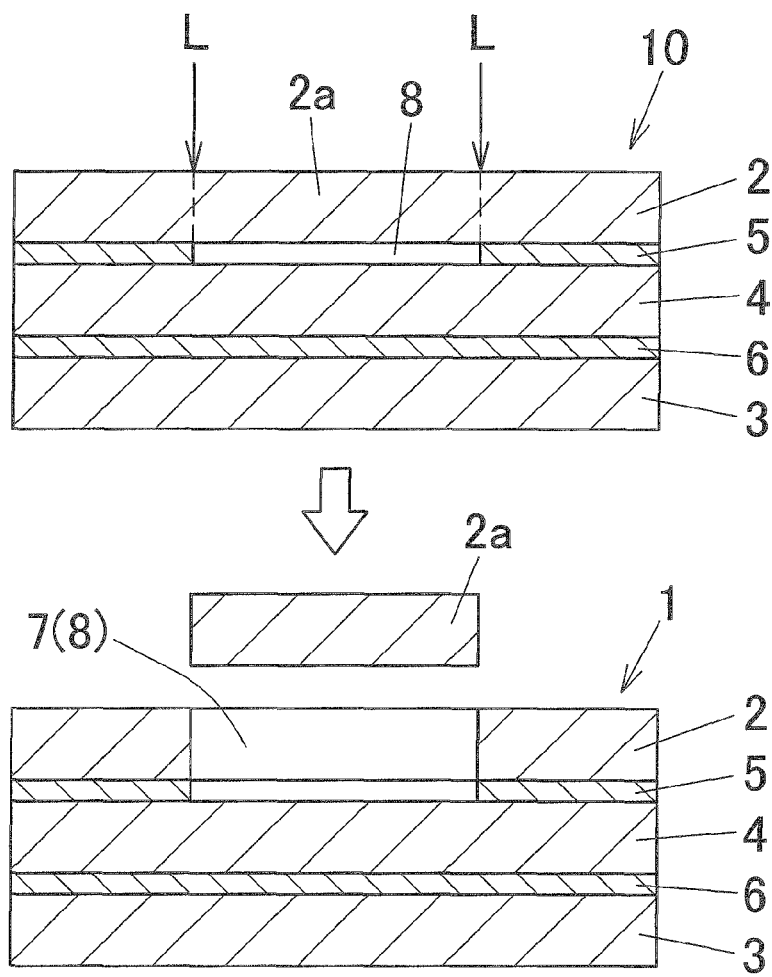
FIG. 4 is a cross-sectional view showing a resin layer removal process.

From the laminated body 10 for a laminated armoring material, the heat-resistant resin layer corresponding to the adhesive agent unapplied sections 8 is removed. Although the removal method is not limited, a method of irradiating a laser on the heat-resistant resin layer 2 to cut the layer and remove the cut portion can be recommended. In the adhesive agent unapplied sections 8, the heat-resistant resin layer 2 and the metal foil layer 4 are not joined and there is no first adhesive agent layer 5. Therefore, as shown in FIG. 4, by irradiating a laser L on the peripheral edge of the adhesive agent unapplied section 8 to cut the heat-resistant resin layer 2, the heat-resistant resin layer 2a existing at the adhesive agent unapplied section 8 can be removed. An advantage of the laser cutting is that, with an appropriate output, only the targeted layer can be cut and occurrence of burrs can be controlled. Also, by removing the heat-resistant resin layer 2a, the metal foil layer 4 is exposed, forming the metal exposed section 7. As a result, a laminated armoring material 1 having the structure as shown in FIG. 1A and FIG. 1B is formed. In the adhesive agent unapplied section 8, since the heat-resistant resin layer 2 is not joined to the metal foil layer 4, it is easy to partially cut the heat-resistant resin layer 2, thereby making it possible to form a planar metal exposed section 7 with an easy operation of cutting the heat-resistant resin layer 2 at the peripheral edge of the adhesive agent unapplied section 8. Since the adhesive agent is not adhered to the adhesive agent unapplied section 8, nothing remains on the surface of the metal foil layer 4 after removing the heat-resistant resin layer 2, allowing an assured exposure of the metal foil layer 4.

The type of the laser is not limited, and either of a solid-state lasers represented by a YAG laser and a gas laser represented by a carbon dioxide laser may be used.

Generally, in a case of using a laminated material in which a metal foil layer and a resin layer is laminated as a packaging material, a flat sheet obtained by a laminating process is processed into a case having a form capable of charging a packaging object, and after charging a packaging object in the case, the opening is heat-sealed to seal the packaged object. The laminated armoring material 1 manufactured by the method of the present invention is also processed into a case having a form capable of charging a packaging object, and after charging the packaging object, the opening of the case is heat-sealed to be used.

The aforementioned resin layer removal process can be performed at any time after obtaining the laminated body 10 for a laminated armoring material by adhering the heat-resistant resin layer 2 and the heat-sealable resin layer 3 to the metal foil layer 4. Therefore, the time at which the removal process of the heat-resistant resin layer as an outer layer is performed will be one of (a) to (d).

(a) Before processing into a case having a form capable of charging a packaging object
(b) Before charging a packaging object in the case
(c) Before charging a packaging object in the case and heat-sealing
(d) After heat-sealing the case in which the packaging object is charged A process into a case having a form capable of charging a packaging object is exemplified by, for example, a process for plastically deforming a flat sheet into a three-dimensional shape by press-forming such as bulging, drawing, etc., or a bag-making process for processing into a bag shape by, e.g., heat-sealing a portion of the flat sheet. Therefore, the laminated body for a laminated armoring material subjected to the resin layer removal process in the aforementioned (a) is a flat sheet, and the laminated body for a laminated armoring material subjected to the resin layer removal process in the aforementioned (b) to (d) is a case. In the abovementioned (b) to (d), a flat sheet-like laminated body 10 for a laminated armoring material is subjected to a plastic deformation process or a bag-making process before performing a resin layer removal process.

As explained above, the method of manufacturing the laminated armoring material of the present invention includes not only a case in which it is completed in a flat sheet state, but a case in which a step of a plastic deformation process or a bag-making process, a step of charging a packaging object, or a step for heat-sealing is additionally performed before the resin layer removal step.

In the method of manufacturing a laminated armoring material of the present invention, at the stage of adhering the heat-resistant resin layer 2 and the metal foil layer 4 together, an adhesive agent is not applied to the section forming the metal exposed section 7. Therefore, there is no risk that an adhesive agent remains on the metal exposed section 7, and thus the metal foil layer 4 can be assuredly exposed.

Figure 5:
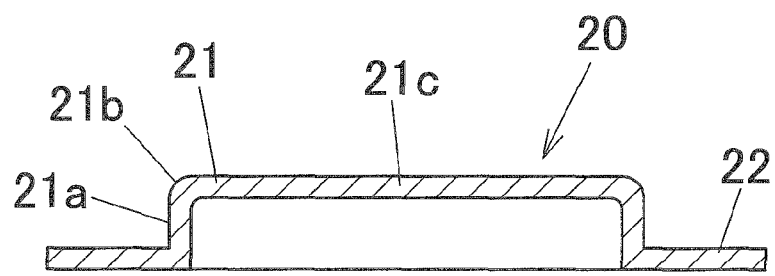
FIG. 5 is a cross-sectional view showing a case in which a laminated armoring material of a flat sheet is formed.

The number of the metal exposed sections 7 is not limited, and an arbitrary number of metal exposed sections 7 can be formed according to the intended purpose of the case. Further, in a laminated armoring material manufactured from a laminated body for a laminated armoring material having a plurality of adhesive agent unapplied sections, adhesive agent unapplied sections in which the heat-resistant resin layer is not removed may remain. The position of the metal exposed section is also not limited, but it is preferable to avoid a position where the process into a case is obstructed or a position where the strength decreases due to the process. For example, as shown in FIG. 5, in a case in which side walls 21a are vertically formed from a flat sheet by bulging or drawing to process into a case in which a concave portion 21 for charging a packaging object is formed, it is preferable to avoid forming a metal exposed section on the side walls 21a and the corner sections 21b having a large deformation amount. In the case 20, it is preferable to form the metal exposed sections on a bottom wall 21c of the concave portion 21 or the flange 22.

Further, the intended purpose of the metal exposed section is not limited, and differs depending on the application of the laminated armoring material. In a battery case manufactured by a laminated armoring material having a metal exposed section on the surface side of the heat-resistant resin layer, the metal exposed section can be used as a soldering section to be soldered to a substrate or a housing, or can be used as an electrode. Further, in applications other than a battery case, a metal exposed section can be formed on an aluminum foil processed container for accommodating jams or processed food products, and a heat generating element is brought into contact with that section to heat food products, or to directly flow electricity to use as a food container in which sterilization is possible by joule heating.

[Other Embodiments of Laminated Armoring Material and Manufacturing Method Thereof]

In the laminated armoring material of the present invention, it is required that a metal exposed section is formed on at least one of the surface sides of the metal foil layer. Therefore, other than a laminated armoring material 1 having the metal exposed section 7 only on the heat-resistant resin layer 2 side, a laminated armoring material having the metal exposed sections only in the heat-sealable resin layer, and a laminated armoring material having the metal exposed section on both surfaces are also included in the present invention. The method of manufacturing a laminated armoring material of the present invention is performed by forming a laminated body for a laminated armoring material by employing the abovementioned adhesive agent unapplied section forming and adhering process when adhering a metal foil layer and a resin layer on the surface side on which the metal exposed section is formed, and thereafter performing a resin layer removal process for removing a resin layer corresponding to the adhesive agent unapplied section. That is, for a laminated armoring material having metal exposed sections on both surfaces, a laminated body for a laminated armoring material is manufactured by employing an adhesive agent unapplied section forming and adhering process on both surfaces of the metal foil. For a laminated armoring material having metal an exposed section only on one surface, the adhesive agent unapplied section forming and adhering process is applied for the one surface and a known adhering process is applied to the other surface to manufacture a laminated body for a laminated armoring material. Then, the manufactured laminated body for a laminated armoring material is subjected to a resin layer removal process.

Figure 6:
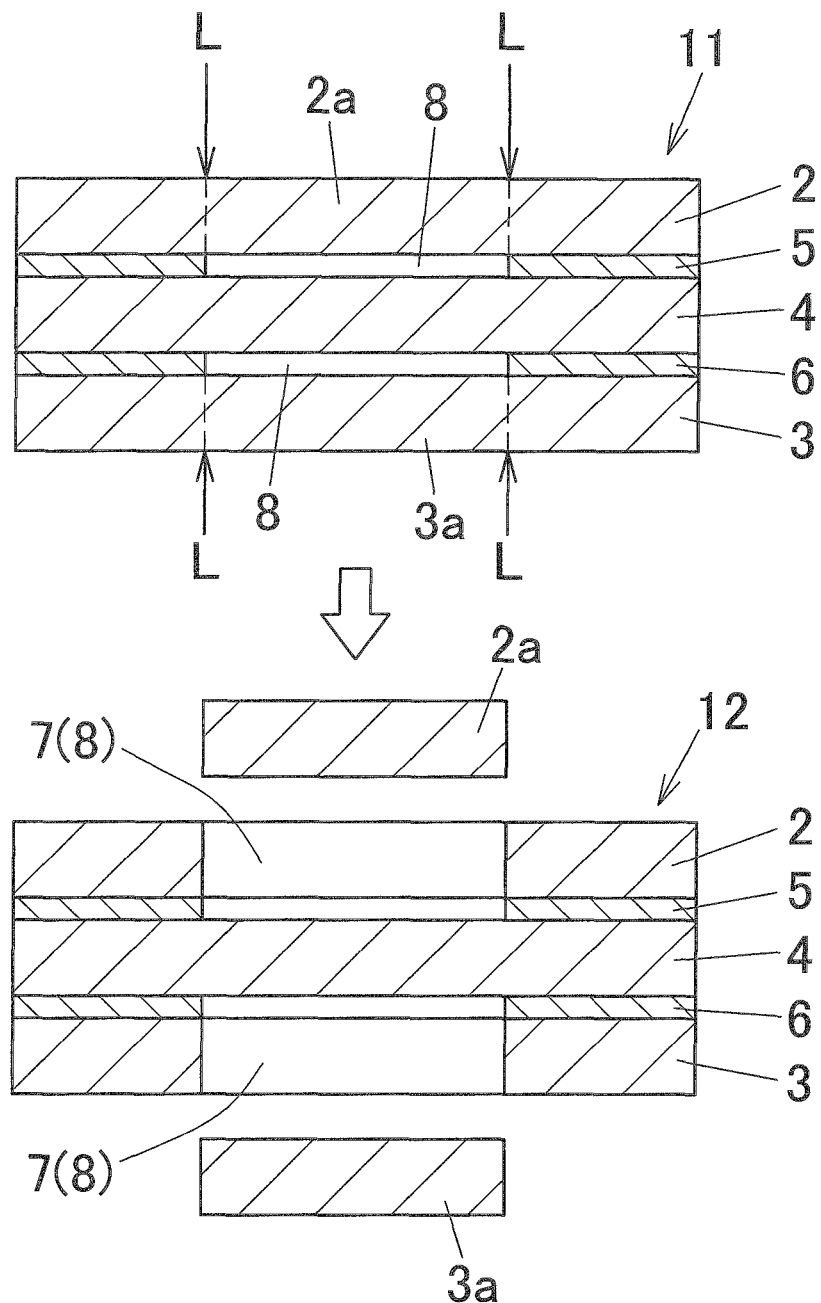
FIG. 6 is a cross-sectional view showing another example of the resin layer removal process.

FIG. 6 shows a laminated body 11 for a laminated armoring material in which adhesive agent unapplied sections 8 are formed on both surfaces of the metal foil layer 4, and a process in which metal exposed sections 7 are formed by performing a resin layer removal process on both surfaces of the laminated body 11 for an laminated armoring material to remove the heat-resistant resin layer 2a and the heat-sealable resin layer 3a from the adhesive agent unapplied sections 8. The manufactured laminated armoring material 12 has metal exposed sections 7 on both surfaces.

Further, since the heat-sealable resin layer 3 is served inside a case, the time to perform the resin layer removal process is limited to before charging packaging objects in the case, which is the aforementioned (a) before process into a case having a form capable of charging packaging objects, or (b) before charging packaging objects in the case. Depending on the shape of the case, the time for performing the resin layer removal process may be further limited to only (a).

The metal exposed section 7 formed on the heat-sealable resin layer 3 side as an inner layer side can be used for joining to an electrode inside a laminated battery. In the case of a food container, the metal exposed section 7 can be used when heating food products by bringing the metal exposed section 7 into contact with a heat generating element or when directly flowing electricity to the food products. Further, the number of the metal exposed section to be formed on the heat-sealable resin layer side can be set arbitrary and the forming position can also be set arbitrary as long as it does not interfere with the process into a case shape, in the same manner as in the metal exposed section to be formed on the heat-resistant resin layer side.

Further, in the case of forming the metal exposed sections on both surfaces, the number and/or the position of the metal exposed sections are not required to coincide with each other, and the metal exposed sections can be set independently depending on the intended use of the metal exposed sections on each surface.

[Constituent Materials of Laminated Armoring Material]

The materials for each layer constituting the laminated armoring material 1 are not specifically limited, and any material can be arbitrarily used according to the intended use. The preferred materials for a packaging material for battery cases, electronic components, food products, pharmaceutical products, etc., can be exemplified as follows.

(Heat-Resistant Resin Layer)

As a heat-resistant resin constituting the heat-resistant resin layer 2 which is an outer layer, a heat-resistant resin that does not melt at a heat sealing temperature when heat-sealing the armoring material is used. As a heat-resistant resin, it is preferable to use a heat-resistant resin having a melting point higher than the melting point of the heat-sealable resin by 10° C. or more, and it is especially preferable to use a heat-resistant resin having a melting point higher than the melting point of the heat-sealable resin by 20° C. or more. As the heat-resistant resin layer 2, for example, a polyamide film, a polyester film, etc., can be exemplified, and these stretched films are preferably used. Among them, from the viewpoint of formability and strength, a biaxially stretched polyamide film or a biaxially stretched polyester film, or a multi-layer film including the biaxially stretched polyamide film or the biaxially stretched polyester film is especially preferable. Further, it is preferable to use a multi-layer film in which a biaxially stretched polyamide film and a biaxially stretched polyester film are joined together. The polyamide film is not especially limited, but for example, a nylon 6 film, a nylon 6, 6 film, an MXD nylon film, etc., can be exemplified. Further, as a biaxially stretched polyester film, a biaxially stretched polybutylene terephthalate (PBT) film, a biaxially stretched polyethylene terephthalate (PET) film, etc., can be exemplified.

Further, it is also preferable to combine a lubricant and/or solid fine particles to improve the slidability of the surface of the heat-resistant resin layer 2 to thereby improve the slidability with respect to the molding die.

It is preferable that the thickness of the heat-resistant resin layer 2 is 9 μm to 50 μm. By setting it to the suitable lower limit or more, sufficient strength can be secured as a packaging material. By setting it to the suitable upper limit or less, the stress at the time of molding can be made small, which in turn can improve the moldability.

(Heat-Sealable Resin Layer)

The heat-sealable resin layer 3 which is an inner layer has excellent chemical resistance against strongly corrosive electrolyte used for lithium ion secondary batteries, etc., and exerts a role of applying heat sealing properties to a packaging material.

As the heat-sealable resin layer 3, it is preferable to use a thermoplastic resin unstretched film. The thermoplastic resin unstretched film is not specifically limited, but in terms of chemical resistance and heat sealing properties, it is preferably constituted by polyethylene, polypropylene, olefin-series copolymer, and their acid modifications and ionomers. Further, as an olefin-series copolymer, EVA (ethylene-vinyl acetate copolymer), EAA (ethylene-acrylic acid copolymer), and EMMA (ethylene-methacrylic acid copolymer) can be exemplified. Further, a polyamide film (e.g., nylon 12) or a polyimide film can also be used.

As to the heat-sealable resin layer 3, similarly to the heat-resistant resin layer 2, it is preferable to combine a lubricant and/or a solid fine particle to improve the slidability of the surface of the heat-resistant resin layer.

It is preferable that the thickness of the heat-sealable resin layer 3 is set to 20 μm to 80 μm. By setting the thickness to 20 μm or more, generation of pinholes can be sufficiently prevented, and by setting the thickness to 80 μm or less, the amount of resin used can be reduced, thereby making it possible to reduce the cost. Among them, it is especially preferable that the thickness of the heat-sealable resin layer 3 is set to 30 μm to 50 μm. Further, the heat-sealable resin layer 3 can be a single layer or a multi-layer. As a multi-layer film, a three-layer film in which a random polypropylene film is laminated on each of both surfaces of a block polypropylene film can be exemplified.

(Metal Foil Layer)

The metal foil layer 4 plays a role of giving gas barrier characteristics for preventing invasion of oxygen and/or moisture into the laminated armoring material 1. The metal foil layer 4 is not especially limited, but for example, an aluminum foil, a copper foil, a nickel foil, a stainless foil, a clad foil thereof, an annealed foil thereof, an unannealed foil thereof, etc., can be exemplified. The metal foil layer 4 is a layer exposed at the metal exposed section 7, and is arbitrarily selected according to the purpose for exposure. Further, as to the aluminum foil, in the case of forming a concave portion 21 by bulging or drawing (see FIG. 5), it is preferable to use an aluminum alloy foil: JIS A8079 or JIS A8021 having good formability. Further, in a case in which formability does not need to be considered, other than the aforementioned aluminum alloy foils, pure aluminum series aluminum foils can also be suitably used.

Further, it is also preferable to use a metal foil plated with a conductive metal such as nickel, tin, copper, chrome, etc., such as a plated aluminum foil. The conductive plated film may be formed at a portion corresponding to at least the metal exposed section of the metal foil layer. Further, it is preferable that the metal foil layer 4 is subjected to the following chemical conversion treatment as a substrate treatment to form a chemical conversion film.

(Chemical Conversion Treatment of Metal Foil Layer)

The outer layer and the inner layer of the laminated armoring material 1 are layers made of resin. For these resin layer, although a minute amount, light, oxygen, and liquid may enter from outside the case and the contents (electrolyte of batteries, food products, pharmaceutical products, etc.) may soak from the inside. When reaching the metal foil layer, these intruded objects cause corrosion of the metal foil layer. In the laminated armoring material 1 of the present invention, by forming a chemical conversion film high in corrosion resistance on the surface of the metal foil layer 4, the corrosion resistance of the metal foil layer 4 can be improved.

The chemical conversion film is a film formed by subjecting the metal foil surface to a chemical conversion treatment, and can be formed, for example, by subjecting the metal foil to a chromate treatment or a non-chromium type chemical conversion treatment using a zirconium compound. For example, in the case of a chromate treatment, after applying a solution of any one of the following mixtures 1) to 3) to the surface of the metal foil to which a degreasing treatment was subjected, it is dried.

1) A mixture of phosphoric acid, chromic acid and at least one of metal salt of fluoride and non-metal salt of fluoride 2) A mixture of phosphoric acid, acrylic resin, either a chitosan derivative resin or a phenol series resin, at least one of chromic acid and chromium (III) salt 3) A mixture of phosphoric acid, any one of acrylic resin, chitosan derivative resin or phenol series resin, at least one of chromic acid and chromium (III) salt For the chemical conversion film, it is preferable that the chromium adhesion amount is 0.1 to 50 mg/m$^2$, more preferably 2 to 20 mg/m$^2$. By the chemical conversion film having the thickness or the chromium adhesion amount, a molding packaging material having high resistance to corrosion can be obtained.

Further, a laminated armoring material having the chemical conversion film on one of surfaces is included in the present invention.

The thickness of the metal foil layer 4 is preferably 20 μm to 200 μm. By setting the thickness to 20 μm or more, generation of pinholes or breakages at the time of rolling and heat sealing when producing a metal foil can be prevented. By setting the thickness to 200 μm or less, the stress at the time of bulging or drawing can be decreased to thereby improve the formability. Further, by setting the thickness of the metal foil layer 4 to 200 μm or less, the increase in weight and cost of materials can be controlled.

(First Adhesive Agent Layer)

The first adhesive agent layer 5 is a layer for joining the metal foil layer 4 and the heat-resistant resin layer 2 as an outer layer. For example, an adhesive agent including a two-part curing type polyester-urethane-based resin including a polyester resin as a base resin and a multifunctional isocyanate compound as a curing agent, or a polyether-urethane-based resin is preferably used.
(Second Adhesive Agent Layer)

The second adhesive agent layer 6 is a layer for joining the metal foil layer 4 and the heat-sealable resin layer 3 as an inner layer. For example, a polyurethane-based adhesive agent, an acrylic-based adhesive agent, an epoxy-based adhesive agent, a polyolefin-based adhesive agent, an elastomer-based adhesive agent, a fluorine-based adhesive agent, etc., can be exemplified. Among them, it is preferable to use an acrylic-based adhesive agent or a polyolefin-based adhesive agent, and in such a case, the resistance to electrolyte and moisture barrier characteristics of the packaging material 1 can be improved. Further, in the case of using the laminated armoring material as a battery case, it is preferable to use an adhesive agent such as an acid-modified polypropylene, polyethylene, etc.

For the adhesive agent unapplied section, since the glossiness is different from the section in which an adhesive agent is applied even through the heat-resistant resin layer or the heat-sealable resin layer, even in a state in which the heat-resistant resin layer or the heat-sealable resin layer is adhered, the position and the shape of the adhesive agent unapplied section can be discriminated.

Further, to make it easy to discriminate the adhesive agent unapplied section, a coloring agent such as an organic pigment, an inorganic pigment, a pigment, etc., can be added to the adhesive agent in a range of 0.1 mass parts to 5 mass parts with respect to 100 mass parts of a resin component. The organic pigment is not especially limited, but for example, an azo pigment such as lake red, naphthols, Hansa yellow, Disazo yellow, benzimidazolone, etc.; a polycyclic pigment such as quinophthalone, isoindolin, pyrrolo-pyrrole, dioxazine, phthalocyanine blue, phthalocyanine green, etc.; a lake pigment such as lake red C, Watchung red, etc., can be exemplified. Further, the inorganic pigment is not especially limited, but for example, carbon black, titanium oxide, calcium carbonate, kaolin, iron oxide, zinc oxide, etc., can be exemplified. Further, the pigment is not especially limited, but for example, a yellow pigment such as a trisodium salt (Yellow No. 4), a red pigment such as a disodium salt (Red No. 3), a blue pigment such as a disodium salt (Blue No. 1) can be exemplified.

Further, regardless of whether a coloring agent is added, by adhering a transparent heat-resistant resin layer or a heat-sealable resin layer, it becomes easy to discriminate the adhesive agent unapplied section. When a coloring agent is added to the adhesive agent, and a transparent heat-resistant resin layer or a heat-sealable resin layer is adhered, it becomes extremely easy to discriminate the adhesive agent unapplied section.

Further, the total thickness of the laminated armoring material is preferably in the range of 50 to 300 µm. The total thickness of the laminated armoring material and the suitable thickness of each of the aforementioned layers differ according to the intended purpose of the laminated armoring material.

EXAMPLES

The laminated armoring material 1 shown in FIG. 1A and FIG. 1B was manufactured. The metal exposed section 7 was a 50 mm×50 mm square.

Example 1

The material of each layer constituting the laminated armoring material 1 was as follows.

Metal foil layer 4: a tin plated film having a thickness of 1 µm was formed on one surface of a soft aluminum foil (JIS H4160 A8079H) having a thickness of 40 µm Heat-resistant resin layer 2: a stretched nylon film having a thickness of 25 µm Heat-sealable resin layer 3: unstretched polypropylene film having a thickness of 30 µm First adhesive agent layer 5: two-part curing type polyester-urethane-based adhesive agent Second adhesive agent layer 6: two-part curing type acid-modified polypropylene-based adhesive agent <Adhering Metal Foil Layer and Heat-Resistant Resin Layer (Adhesive Agent Unapplied Section Forming and Adhering Process)>

The heat-resistant resin layer 2 and the metal foil layer 4 were adhered together using the dry laminating method shown in FIG. 3. As an adhesive agent application roll, a gravure roll 31 having convex portions 31a having a top surface measurement of 50 mm×50 mm was used.

On the tin-plated film side surface of the metal foil layer 4, an adhesive agent composition 5a whose concentration was adjusted with a solvent was applied using the gravure roll 31 and dried to thereby form the first adhesive agent layer 5 having adhesive agent unapplied sections 8 corresponding to the convex portion 31a shape. Subsequently, the heat-resistant resin layer 2 was stacked on the first adhesive agent layer 5 side and pressure-joined to obtain an intermediate laminated body 41. Further, the intermediate laminated body 41 was cured for three days at 40° C. in an aging furnace to cure the first adhesive agent layer 5. The thickness of the first adhesive agent layer 5 after curing was 4 µm.

<Adhering Metal Foil Layer and Heat-Sealable Resin Layer>

On the other surface of the metal foil layer 4 of the intermediate laminated body 41 after curing, an adhesive agent composition whose concentration was adjusted by a solvent was applied using the dry laminating method shown in FIG. 3 and dried to form the second adhesive agent layer 6, and a heat-sealable resin layer 3 was adhered. Further, the second adhesive agent layer 6 was hardened by being cured for three days at 40° C. in an aging furnace to cure. The thickness of the second adhesive agent layer 6 after curing was 2 µm.

By the abovementioned two processes, the laminated body 10 for a laminated armoring material as shown in FIG. 2 was obtained.
<Resin Layer Removal Process)

As shown in FIG. 4, on the laminated body 10 for a laminated armoring material, YAG laser L was irradiated along the peripheral edge of the adhesive agent unapplied section 8 of the heat-resistant resin layer 2 to cut the heat-resistant resin layer 2 to thereby remove the heat-resistant resin layer 2a corresponding to the adhesive agent unapplied section 8. With this, the metal foil layer 4 was exposed, and a laminated armoring material 1 having a metal exposed section 7 was obtained.
<Process into Case>

A flat sheet-like laminated armoring material 1 was processed into a cubic shape case 20 as shown in FIG. 5. In the process, using a straight mold including a polytetrafluoroethylene punch having length 100 mm×width 100 mm and corners R: 2 mm and a die having length 100.5 mm×width 100.5 mm and corners R: 2.25 mm and having a free forming height, bulging one step forming was performed in a manner such that the inner heat-sealant resin layer 3 was in contact with the punch, to form a concave portion 21 having a side wall 21a 4 mm in height (formed depth). In this forming process, the laminated armoring material 1 was positioned so that the center of the punch matched the center of the metal exposed section 7, and the metal exposed section 7 was formed at the center of the outer surface of the bottom wall 21c of the concave portion 21. The laminated armoring material 1 after the bulging process was cut leaving a flange having a width of 10 mm at the opening edge of the concave portion 21.

Example 2

A laminated armoring material 1 was manufactured in the same manner as in Embodiment 1 except that a nickel plated film having a thickness of 1 μm was formed on one surface of a soft aluminum foil (JIS H4160 A8079H) having a thickness of 40 μm as the metal foil layer 4, 1 and then processed into a case 20.

Example 3

A laminated armoring material 1 was manufactured in the same manner as in Embodiment 1 except that a soft stainless foil (SUS304) having a thickness of 20 μm was used as the metal foil layer 4, and then processed into a case 20.

Example 4

A laminated armoring material 1 was manufactured in the same manner as in Embodiment 1 except that a soft aluminum foil (JIS H4160 A8079H) having a thickness of 40 μm without plating was used as the metal foil layer 4, and then processed into a case 20.

In the laminated armoring materials of Embodiments 1 to 4, metal exposed sections could be assuredly formed with easy operations and could be processed into cases 20 without hindrance.

The present invention claims priority to Japanese Patent Application No. 2014-78786 filed on Apr. 7, 2014, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

INDUSTRIAL APPLICABILITY

The present invention can be suitably used for manufacturing a laminated armoring material used as a packaging material.

The invention claimed is:

1. A method of manufacturing a laminated armoring material, comprising:

adhering a first resin layer to a first surface of a metal foil layer via a first adhesive agent layer;
adhering a second resin layer to a second surface of the metal foil layer via a second adhesive agent layer; and
removing a part of at least one of the first resin layer and the second resin layer,
wherein the at least one of the first resin layer and the second resin layer is adhered to the metal foil layer via one of the first adhesive agent layer and the second adhesive agent layer formed by applying an adhesive agent to a joining region of the metal foil layer and the at least one of the first resin layer and the second resin layer excluding a part of the joining region so that an adhesive agent unapplied section in which the adhesive agent is not applied is formed, and
wherein the part of at least one of the first resin layer and the second resin layer corresponds to the adhesive agent unapplied section, and is removed to expose the metal foil layer.

2. The method of manufacturing the laminated armoring material as recited in claim 1, wherein the adhesive agent is applied using a roll having concave and convex portions on a peripheral surface to form the adhesive agent unapplied section corresponding to a shape of the convex portion.

3. The method of manufacturing the laminated armoring material as recited in claim 1, wherein removing the part of at least one of the first resin layer and the second resin layer is executed to a flat-sheet like laminated body for an armoring material before being processed into a case.

4. The method of manufacturing the laminated armoring material as recited in claim 3, wherein the process into the case is a plastic deformation process for forming a concave portion from a flat sheet.

5. The method of manufacturing the laminated armoring material as recited in claim 3, wherein the process into the case is a bag-making process for forming a flat sheet into a bag shape.

6. The method of manufacturing the laminated armoring material as recited in claim 1, wherein removing the part of at least one of the first resin layer and the second resin layer is executed after a flat-sheet like laminated body for a laminated armoring material is processed into a case.

7. The method of manufacturing the laminated armoring material as recited in claim 1, wherein the part of at least one of the first resin layer and the second resin layer is cut by irradiating a laser.

8. The method of manufacturing the laminated armoring material as recited in claim 1, wherein a conductive plating film is formed at least on a metal exposed section of the metal foil layer.

9. The method of manufacturing the laminated armoring material as recited in claim 1, wherein the first resin layer is a heat-resistant layer and the second resin layer is a heat-sealable layer.

* * * * *